(12) United States Patent
Ogawa et al.

(10) Patent No.: US 12,336,658 B2
(45) Date of Patent: Jun. 24, 2025

(54) ELECTRIC COOKER

(71) Applicant: SUNTEC CO., LTD., Tokyo (JP)

(72) Inventors: Tomoyuki Ogawa, Tokyo (JP); Yasuo Wada, Tokyo (JP)

(73) Assignee: SUNTEC CO., LTD., Tokyo (JP)

( * ) Notice: Subject to any disclaimer, the term of this patent is extended or adjusted under 35 U.S.C. 154(b) by 0 days.

(21) Appl. No.: 17/783,239

(22) PCT Filed: Dec. 23, 2021

(86) PCT No.: PCT/JP2021/047815
§ 371 (c)(1),
(2) Date: Jun. 7, 2022

(87) PCT Pub. No.: WO2023/119545
PCT Pub. Date: Jun. 29, 2023

(65) Prior Publication Data
US 2024/0180363 A1    Jun. 6, 2024

(51) Int. Cl.
A47J 37/06    (2006.01)
A47J 37/01    (2006.01)
E05D 7/04    (2006.01)

(52) U.S. Cl.
CPC ......... A47J 37/0611 (2013.01); A47J 37/015 (2013.01); E05D 7/04 (2013.01); A47J 2037/0617 (2013.01); E05Y 2900/30 (2013.01)

(58) Field of Classification Search
CPC .......... A47J 37/0611; A47J 37/015; A47J 2037/0617; A47J 37/06; A47J 37/0676; A47J 37/049; A47J 37/0629

(Continued)

(56) References Cited

U.S. PATENT DOCUMENTS 3,682,348 A    8/1972    Roberts
6,363,839 B1    4/2002    Wu
(Continued)

FOREIGN PATENT DOCUMENTS

JP    5662624 B1    2/2015
TW    201544058 A    12/2015
WO    2017118623 01    7/2017

OTHER PUBLICATIONS

International Search report for PCT/JP2021/047815, Issued on Aug. 2, 2022, Total of three pages.
(Continued)

Primary Examiner — Phuong T Nguyen
(74) Attorney, Agent, or Firm — Apex Juris, pllc; Hilde M. L. Coeckx

(57) ABSTRACT

An electric cooker having a base body provided with an electric heater, a lid member provided with an electric heater and pivotably supported to the base body by a hinge shaft, and a hinge-shaft-height adjustment mechanism for adjusting the vertical position of the hinge shaft. The hinge-shaft-height adjustment mechanism includes a support portion mounted on the base body, an adjustment guide hole formed on the support portion to have a wide-width portion and a narrow-width portion alternately in a vertical direction, the hinge shaft formed with an engaging shaft portion which is engaged with the adjustment guide hole to be capable of moving vertically and rotating, and an operating lever pivoting with the hinge shaft. The engaging shaft portion moves from either the wide-width portion in an upper or lower side to the other of those through the narrow-width portion by rotating according to operation of the operating lever.

10 Claims, 10 Drawing Sheets

(58) Field of Classification Search
USPC ......... 99/325, 331, 339, 342, 344, 351, 372,
99/375, 376, 379, 380, 400, 422, 425,
99/445, 446; 219/386, 401, 415, 461,
219/492, 494, 524, 585, 525, 537, 521
See application file for complete search history.

(56) References Cited

U.S. PATENT DOCUMENTS

| | | |
|---|---|---|
| 2012/0152126 A1 | 6/2012 | Robinson |
| 2016/0270593 A1* | 9/2016 | Ogawa ................. A47J 37/0611 |
| 2017/0367531 A1 | 12/2017 | Yan |

OTHER PUBLICATIONS

Search Report for TW110148975, Issued Jul. 20, 2022, Total of 1 page.
Office Action for TW110148975, Issued Jul. 21, 2022, Total of 6 pages.
Translation of Abstract of TW201544058, Total of 1 page.
Examination Report for Australian Patent application No. 2021393851, Issued on Sep. 7, 2023, Total of 5 page.

* cited by examiner

ELECTRIC COOKER

CROSS-REFERENCE TO RELATED APPLICATIONS

This application is a U.S. National Phase of International Application No. PCT/JP2021/047815, filed on Dec. 23, 2021, the entire content of which is hereby incorporated by reference for all purposes.

FIELD OF THE INVENTION

The present invention relates to an electric cooker for baking food such as bread, snack cake, and so on.

BACKGROUND OF THE INVENTION

Conventionally, an electric cooker has a base body to which a lower die plate is mounted on its upper surface and a lid member to which an upper die plate is mounted on its lower surface, and has a formation to bake a baking food that a rear portion of the lid member is pivotably supported to the base body by a hinge shaft, that dough is filled into a space formed between the upper and lower die plates, and that the upper and lower die plates are heated from each backside of them by electric heaters.

JP 5,662,624 B discloses an invention having a formation that upper and lower die plates are possible to be exchanged respectively according to a baking food to be capable of corresponding to plural kinds of baking foods, and that to avoid variation in a baking degree of the baking foods owing to the thickness of the upper and lower die plates, a hinge-shaft-height adjustment mechanism is provided on a rotation part of the lid member to the base body such that a hinge shaft which is a rotation center of the lid member is capable of adjusting its vertical position and facing surfaces of the respective lower and upper die plates are uniformly and closely fitted.

SUMMARY OF THE INVENTION

However, regarding the invention disclosed in JP 5,662,624 B, while plural kinds of the upper and lower die plates different in each thickness are capable of being exchanged according to the kinds of the baking foods, and the hinge shaft is adjusted in a proper position by the hinge-shaft-height adjustment mechanism such that the facing surfaces of the respective lower and upper die plates can be uniformly and closely fitted, a manufacturing cost may increase because the hinge-shaft-height adjustment mechanism is complex in its structure.

In view of the above disadvantages, an object of the present invention is to provide a low-cost electric cooker having a hinge shaft capable of stepwise adjusting its vertical position according to the thickness of die plates used by a simple structure.

According to the present invention, the above disadvantages are solved as follows.

The electric cooker of the disclosure includes a base body provided with an electric heater, a lower die plate detachably mounted on an upper surface of the base body, a lid member which is provided with an electric heater and is pivotably supported to the base body in a relatively pivotable manner by a hinge shaft oriented in a lateral direction such that the lid member is capable of upward pivoting, an upper die plate detachably mounted on a lower surface of the lid member such that a lower surface of the upper die plate overlaps with an upper surface of the lower die plate, and a hinge-shaft-height adjustment mechanism capable of adjusting a vertical position of the hinge shaft. The hinge-shaft-height adjustment mechanism includes a support portion mounted on the base body, an adjustment guide hole formed on the support portion to have a wide-width portion and a narrow-width portion alternately in a vertical direction, the hinge shaft formed with an engaging shaft portion on an end portion, the engaging shaft portion being engaged with the adjustment guide hole to be capable of moving vertically and rotating, and an operating lever capable of pivoting integrally with the hinge shaft. The engaging shaft portion is capable of moving from either the wide-width portion in an upper or lower side to the other of these wide-width portions through the narrow-width portion by rotating at a predetermined angle according to a pivoting operation of the operating lever.

Since the hinge shaft is made to be capable of stepwise adjusting its vertical position according to the thickness of the die plates used by a simple structure, it is possible to provide a low-cost electric cooker to which plural kinds of die plates having different thickness can be respectively attached in a proper condition such that the plural kinds of die plates can be used in that single electric cooker.

DETAILED DESCRIPTION OF EMBODIMENTS

Figure 1:
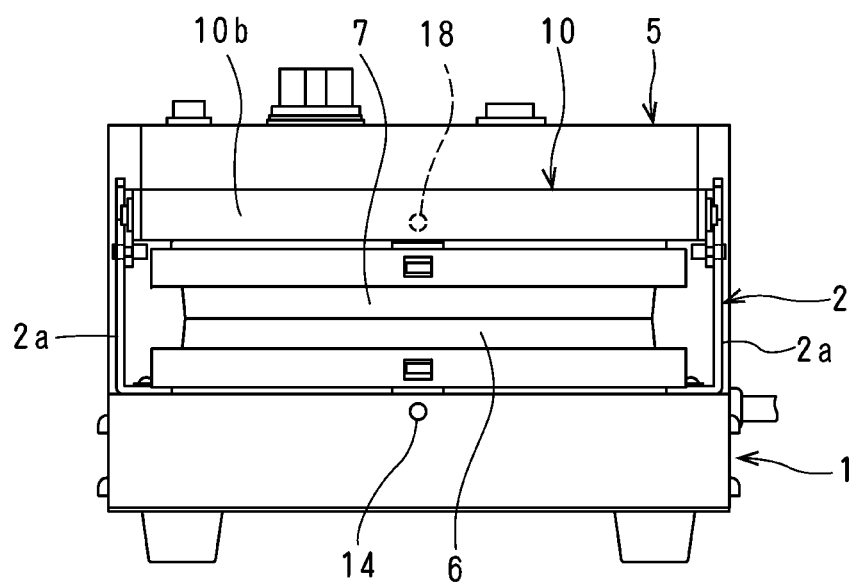
FIG. 1 is a front elevational view showing an electric cooker according to the inventive subject matter.

The present invention is explained by referring to an embodiment on the basis of the drawings as follows. However, the present invention is not limited to the following embodiment, and proper changes and modifications may be added to the following embodiment within an obvious scope to a person skilled in the art.

As shown in FIGS. 1 to 5, an electric cooker includes a box-like base body 1 formed in a rectangular shape in a plan view; a support bracket 2 formed in an upward U-shape in a front view and fixed to a rear portion of an upper surface of the base body 1; a hinge shaft 4 which is capable of vertically moving in height-adjustment guide holes 3 respectively formed on a pair of upward support portions 2a, 2a of the support bracket 2 to be oriented in a vertical direction, and is rotatably supported around an axis in a lateral direction; a lid member 5 formed in a square-like shape in the plan view, a rear end portion of it being supported in a relatively pivotable manner by the hinge shaft 4; a lower die plate 6 detachably mounted on the upper surface of the base body 1; an upper die plate 7 detachably mounted on a lower surface of the lid member 5; and an operating lever 8 operated when a vertical position of the hinge shaft 4 is adjusted.

Incidentally, in the following description, a direction criteria of the lid member 5 and members attached to it is on the basis of a state that the lid member 5 is in a closed position to overlap the lower die plate 6 with the upper die plate 7 as shown in FIG. 1 and by a solid line in FIG. 2. The electric cooker of the present embodiment has a basic shape of lateral symmetry except for certain parts, and thus a structure on the right side thereof is described as a representative example in the following description. Therefore, a direction in a structure on the left side of the electric cooker is opposite to the left-right direction explained concerning the structure on the right side thereof in the drawings.

The electric cooker of the present embodiment is capable of stepwise adjusting the vertical position of the hinge shaft 4 supported by the adjustment guide holes 3 when the operating lever 8 composing a part of a hinge-shaft-height adjustment mechanism described later is operated to pivot such that the electric cooker is applicable for plural kinds of the lower and upper die plates 6, 7 respectively having different thickness.

The hinge-shaft-height adjustment mechanism includes the left and right support portions 2a of the support bracket 2 composing a part of the base body 1; the adjustment guide holes 3 respectively formed on the left and right support portions 2a; the hinge shaft 4 engaged with the left and right adjustment guide holes 3 to be rotatable and capable of stepwise adjusting its vertical position; and the left and right operating levers 8 capable of integrally pivoting with the hinge shaft 4.

A control box 9 is fixed to the rear end of the base body 1, wherein a power switch 9a, a heater temperature control knob 9b, and a pilot lamp 9c are arranged on an upper surface of the control box 9, and a control board (not shown) is housed in the control box 9.

A base portion 2b elongated in the left-right direction of the support bracket 2 is fixed to the base body 1 in front of the control box 9 with a plurality of screws. The left and right support portions 2a of the support bracket 2 are respectively formed with the above-described adjustment guide holes 3 oriented in the vertical direction for guiding the engaging shaft portions 4a respectively formed on both end portions of the hinge shaft 4 to be rotatable and capable of vertically moving.

Figure 7:
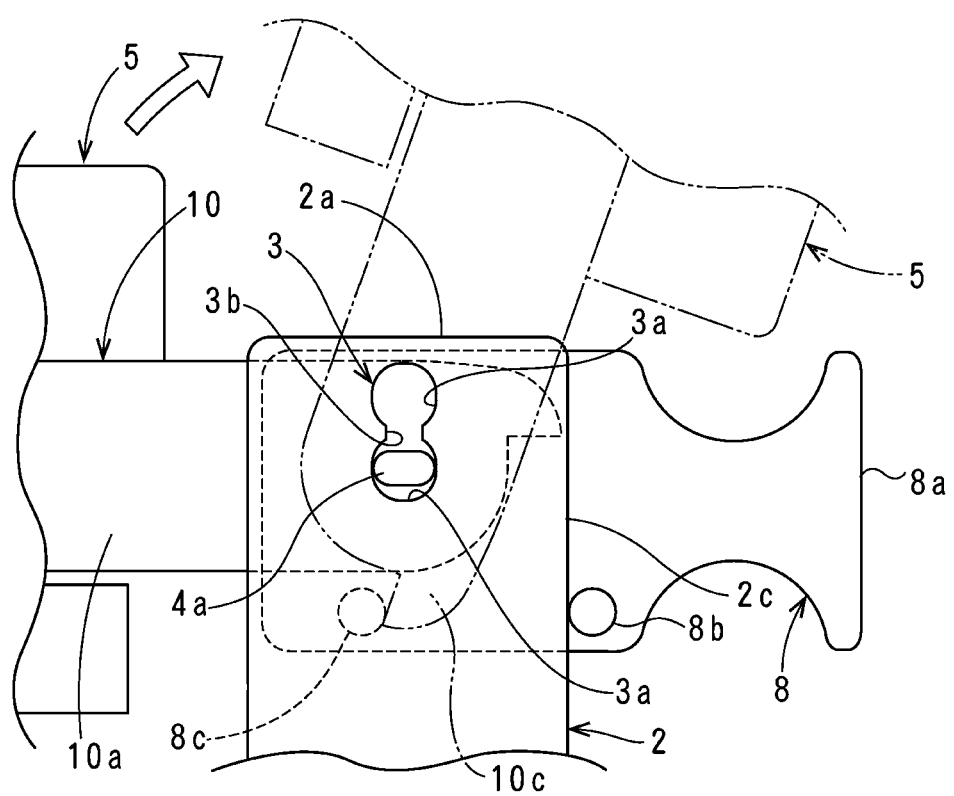
FIG. 7 is a schematic enlarged view showing a principal part in a state where the hinge shaft is in a lower position.
Figure 8:
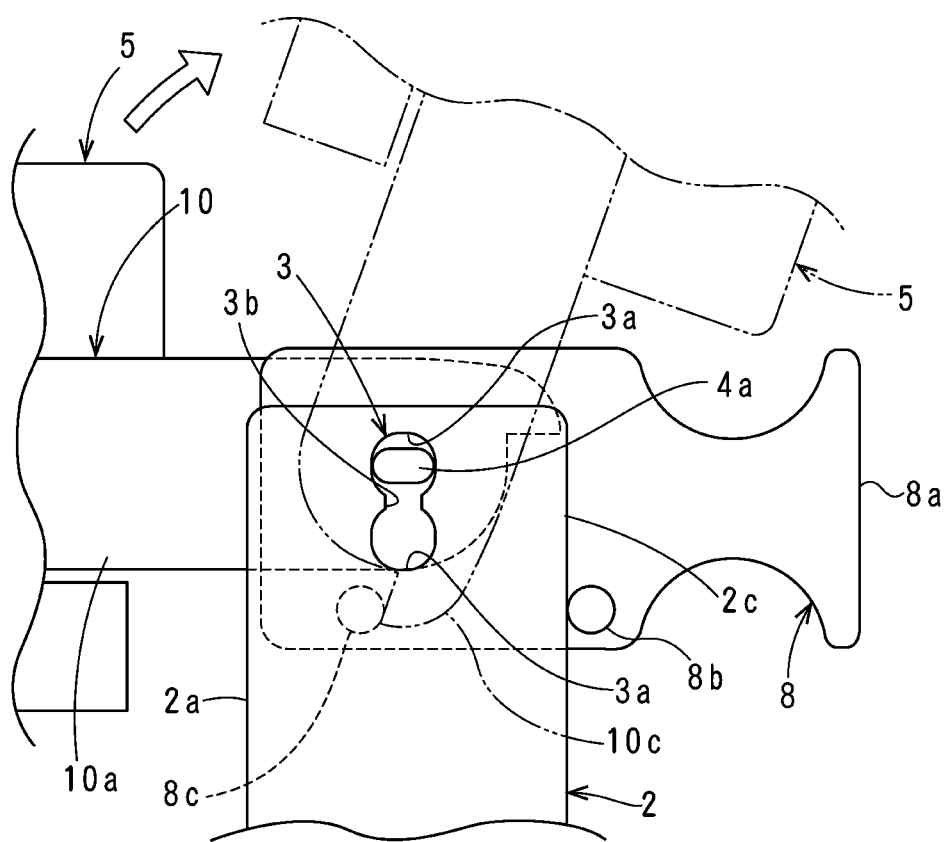
FIG. 8 is a schematic enlarged view showing the principal part in a state where the hinge shaft is in an upper position.
Figure 9:
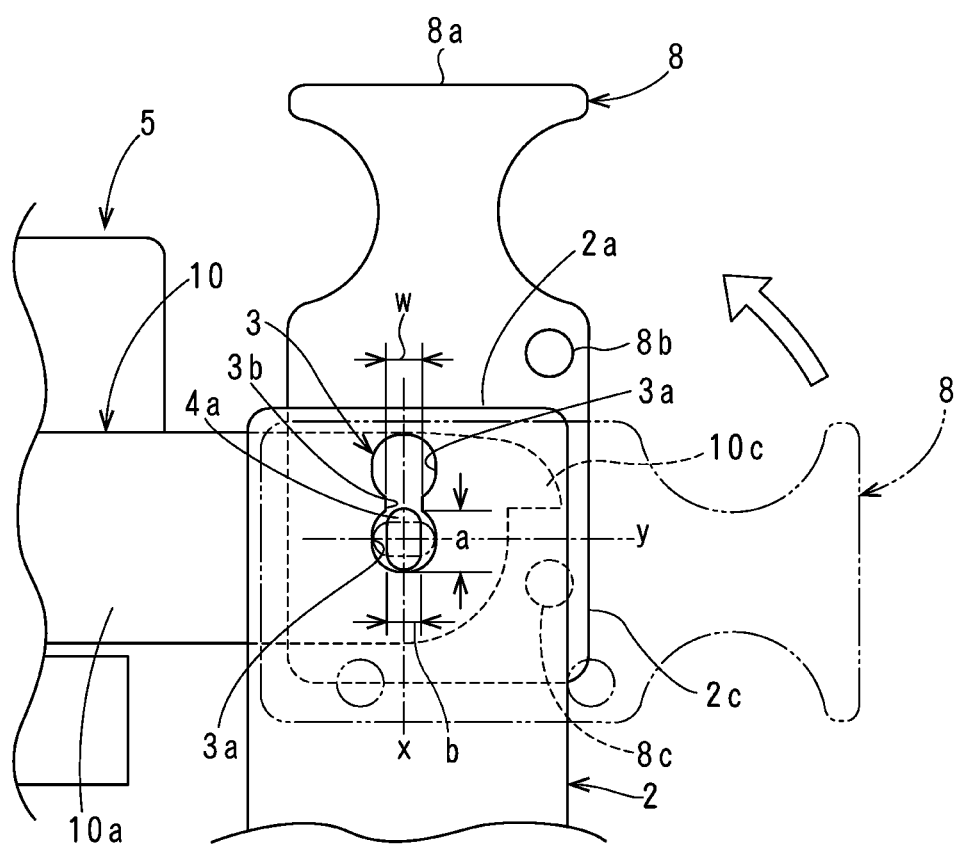
FIG. 9 is a schematic enlarged view showing the principal part in a state where an operating lever is operated.
Figure 10:
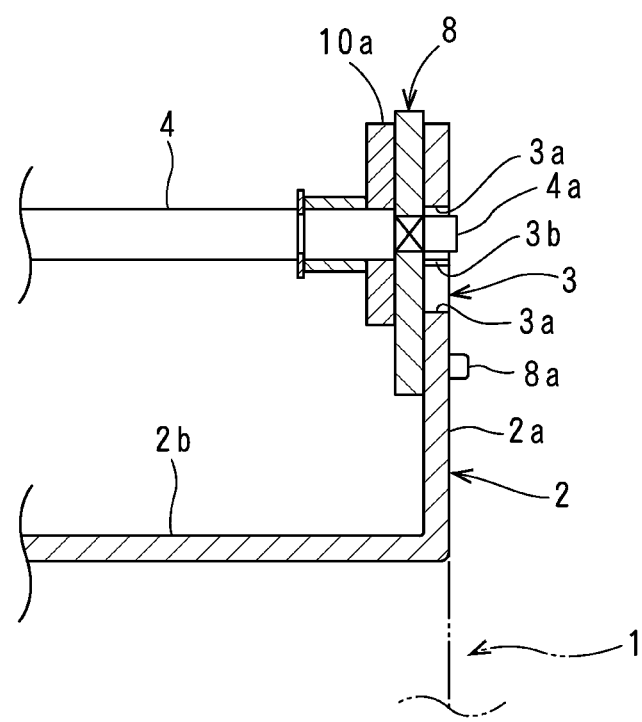
FIG. 10 is a vertical cross-sectional view taken along the line X-X in FIG. 3.

Particularly as shown in FIGS. 7 to 9, the adjustment guide holes 3 is formed with a wide-width portion 3a and a narrow-width portion 3b alternately in the vertical direction. In the present embodiment, two wide-width portions 3a are formed in upper and lower positions and one narrow-width portion 3b is formed between the upper and lower wide-width portions 3a such that the hinge shaft 4 is capable of vertically adjusting its position in two steps. However, the present invention is not limited to this embodiment. It may be possible to vertically form more than three wide-width portions 3a such that the hinge shaft 4 is capable of vertically adjusting its position in more than three steps.

The hinge shaft 4 is made of a solid cylindrical rod. The hinge shaft 4 is formed with the engaging shaft portions 4a on both end portions, the engaging shaft portions 4a being respectively engaged with the adjustment guide holes 3 to be capable of moving vertically and rotating. Particularly as shown in FIG. 9, both sides of the engaging shaft portion 4a are cut such that a cross-section of the engaging shaft portions 4a is formed in an oval-like shape having a long diameter along with a direction x and a short diameter along with a direction y. A dimension a in the long diameter direction x of the engaging shaft portion 4a is set to rotatably engage with the wide-width portion 3a of the adjustment guide hole 3 and to be larger than an open width w of the narrow-width portion 3b. A dimension b in the short diameter direction y of the engaging shaft portions 4a is set to be smaller than the dimension a and to be smaller than the open width w of the narrow-width portion 3b.

As described above, by setting the dimension of each of the engaging shaft portions 4a of the hinge shaft 4, when the each of engaging shaft portions 4a is in a position such that its long diameter direction y is oriented in the longitudinal direction, that is, in a locked position shown by a two-dot chain line in FIG. 9 and is engaged with the lower wide-width portion 3a of the adjustment guide hole 3, the hinge shaft 4 is rotatably held in the lower wide-width portion 3a. When the operating lever 8 is made to be pivoted upward at an angle of about 90 degrees to a position shown by a solid line in FIG. 9 while the engaging shaft portion 4a is engaged with the lower wide-width portion 3a, the engaging shaft portion 4a is rotated to a released position where its long diameter direction x is oriented in the vertical direction and its short diameter direction y is oriented in the longitudinal direction. Thus, the engaging shaft portion 4a is made to be capable of passing through the narrow-width portion 3b, the hinge shaft 4 can be moved from the lower wide-width portion 3a to the upper wide-width portion 3a, and the rear end portion of the lid member 5 can be moved upward. When the operating lever 8 is made to be pivoted upward at an angle of about 90 degrees while the engaging shaft portion 4a is engaged with the upper wide-width portion 3a such that the long diameter direction x of the engaging shaft portion 4a is oriented from the longitudinal direction to the vertical direction, the hinge shaft 4 can be moved down from the upper wide-width portion 3a to the lower wide-width portion 3a.

Rear-end portions of a later-described handle 10 fixed to the lid member 5 are respectively supported by the hinge shaft 4 in a relatively pivotable manner. Thus, the lid member 5 is pivotably supported to the base body 1 by the hinge shaft 4.

The operating levers 8 are respectively fixed to both end portions of the hinge shaft 4 to integrally pivot with the hinge shaft 4 and are respectively formed with operation parts 8a elongating rearward. When the hinge shaft 4 is in the locked position shown by the two-dot chain line in FIG. 9, the operating lever 8 is in the locked position together with the hinge shaft 4 where the operation part 8a faces rearward. When the operating lever 8 is made to pivot upward from the locked position at an angle of about 90 degrees, the hinge shaft 4 is rotated to the released position shown by the solid line in FIG. 9 such that the operating lever 8 is in the released position together with the hinge shaft 4.

A cylindrical first stopper 8b projecting outside is fixed to an outside surface of the operating lever 8. As shown in FIGS. 7, 8, the first stopper 8b abuts with an abutted portion 2c which is an end edge of the support portion 2a of the support bracket 2 and limits a pivoting degree of the operating lever 8 to hold the operating lever 8 in the locked position. A cylindrical second stopper 8c projecting inside is fixed to an inside surface of the operating lever 8. As shown in FIGS. 7, 8, when the operating lever 8 is held in the locked position, the second stopper 8c abuts with a later-described abutting portion 10c which is formed in a claw shape on the rear end portion of the handle 10 fixed to the lid member 5 and limits a pivoting degree of the lid member 5 to stop the lid member 5 in a fully open position.

Figure 5:
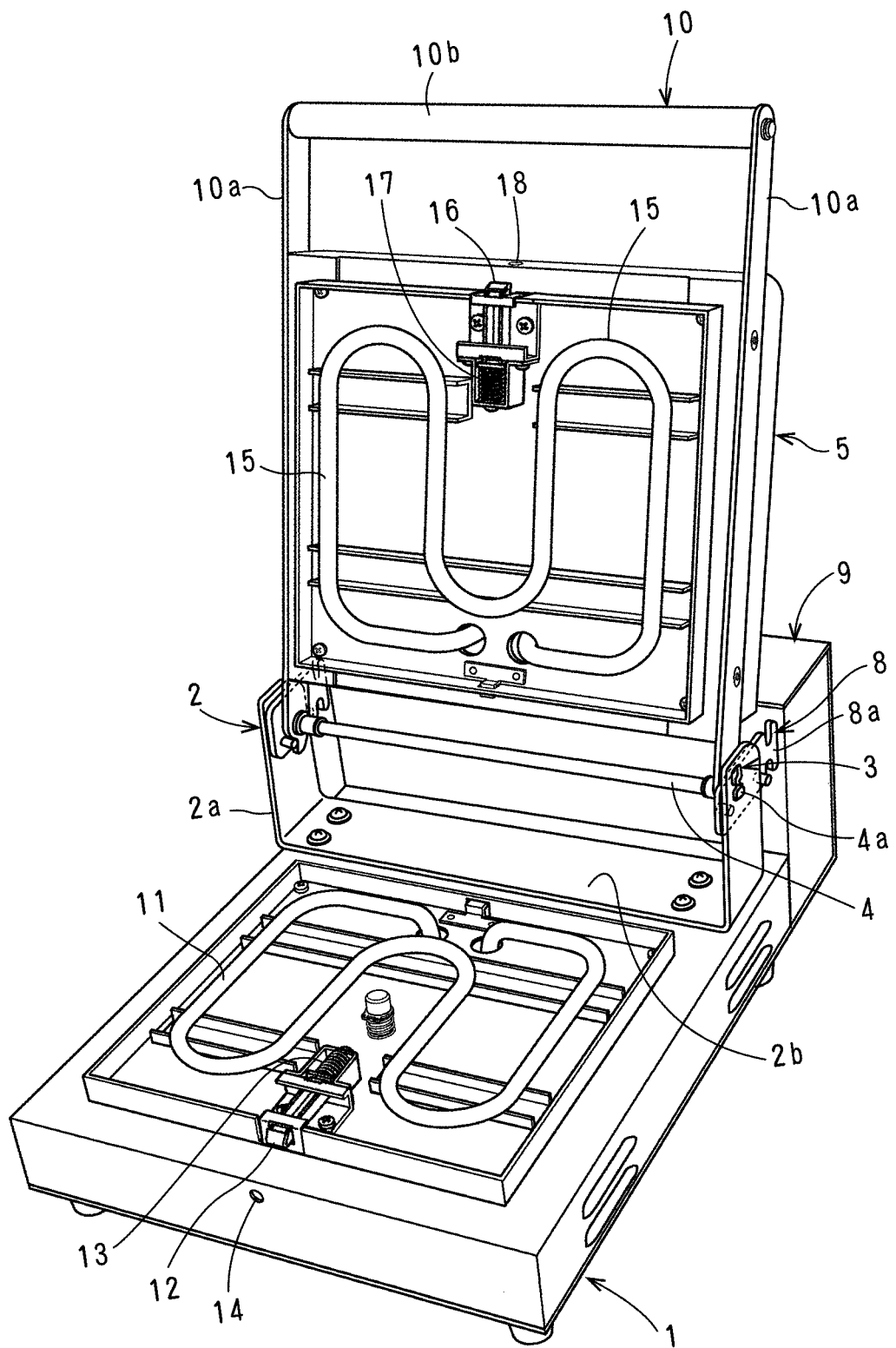
FIG. 5 is a perspective view showing the electric cooker in a state where upper and lower die plates are detached and the lid member is in a fully open position.
Figure 6:
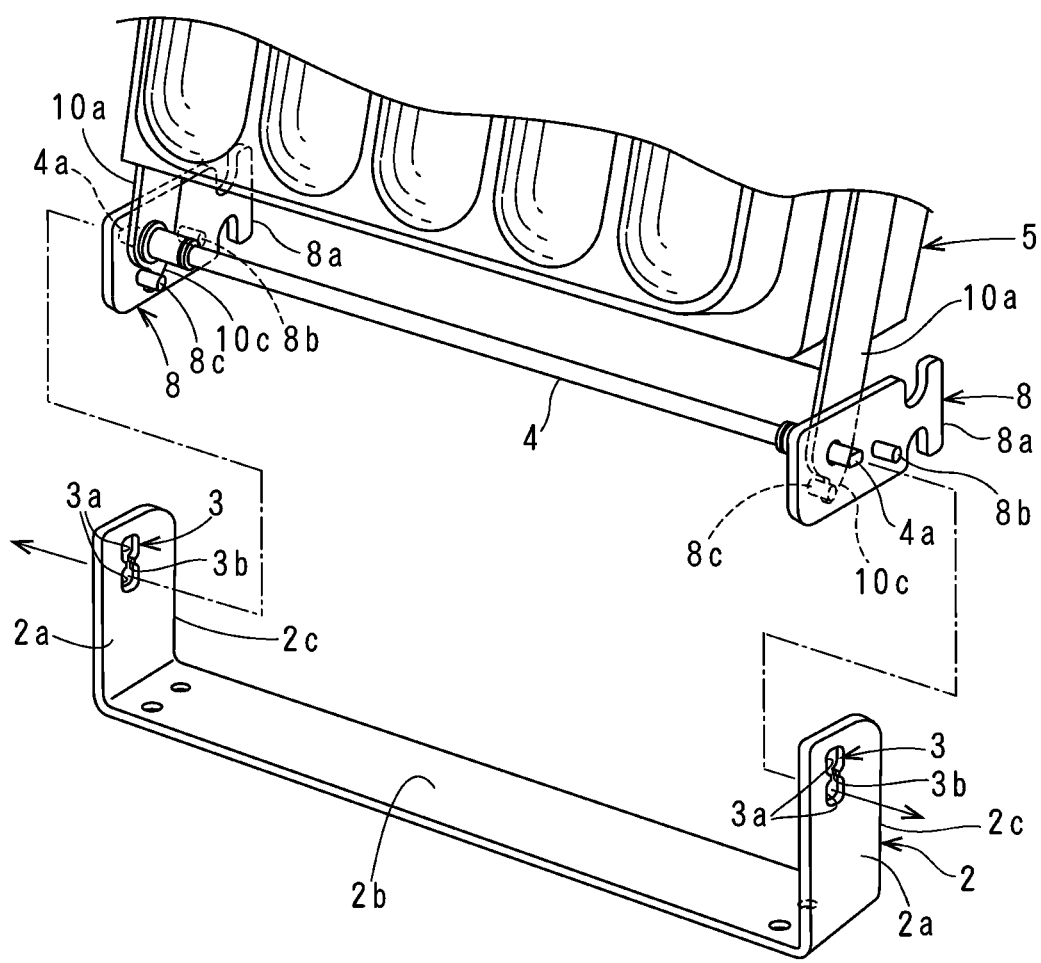
FIG. 6 is an exploded perspective view showing a principal part including a hinge-shaft-height adjustment mechanism of the electric cooker.

As shown in FIG. 5, an electric heater 11 to heat the lower die plate 6 from its lower side is mounted on the upper surface of the base body 1. The electric heater 11 is electrically coupled with a power supplying device not shown mounted in the control box 910.

Figure 4:
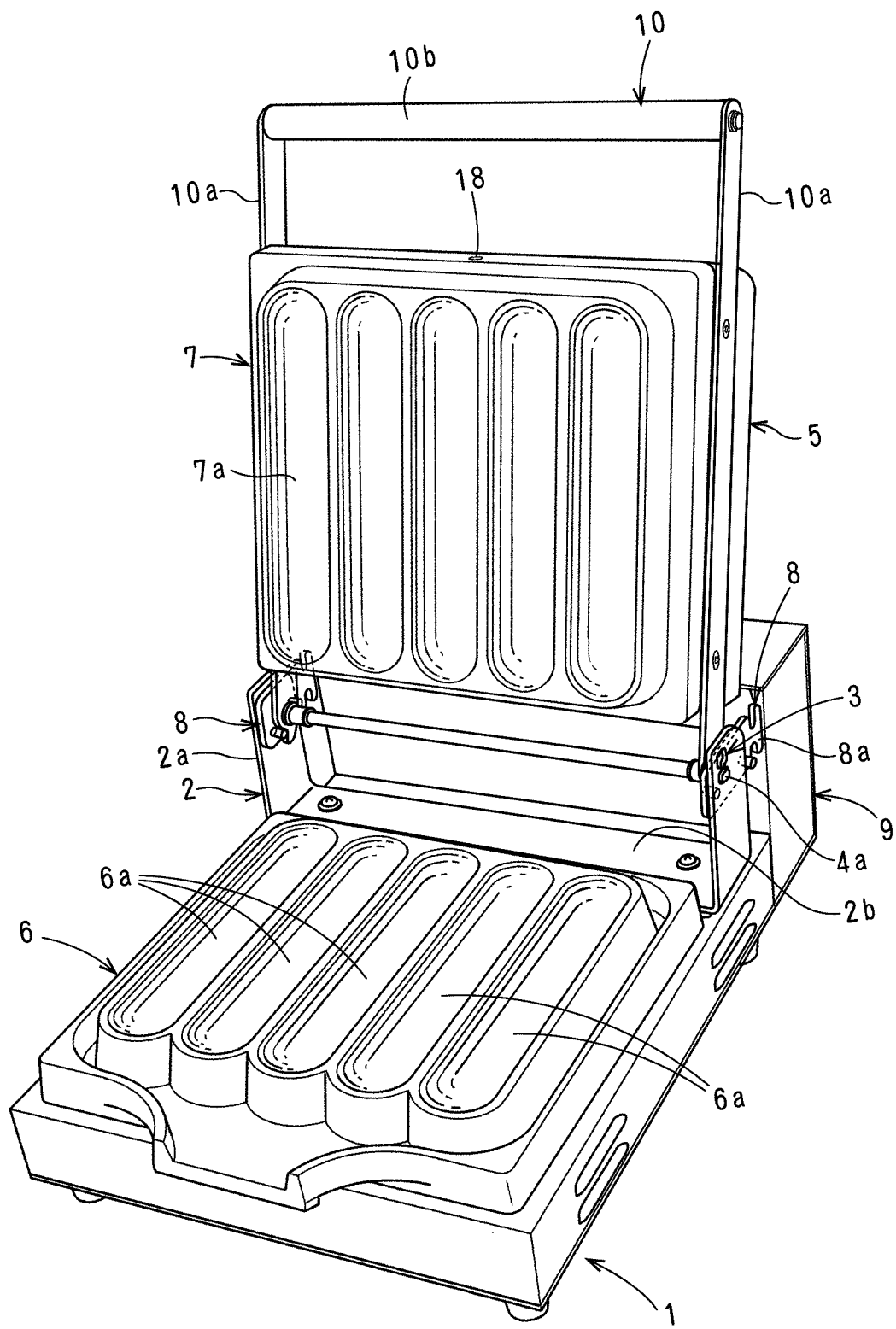
FIG. 4 is a perspective view showing the electric cooker in a state where a lid member is open.

As shown in FIG. 4, the lower die plate 6 is formed in a square-like shape in the plan view, is made of material excellent in thermal conductivity such as an aluminum alloy, and is detachably mounted over the electric heater 11 on the base body 1. The lower die plate 6 is formed with concavities 6a into which the dough of a baking food is filled.

When the lower die plate 6 is mounted over the electric heater 11 on the base body 1, it is engaged with a latch 12 provided on a front portion of the upper surface of the base body 1 to be movable in the longitudinal direction (see FIG. 5) and is fixed in a mounted state. Incidentally, the latch 12 is biased frontward by a compression coil spring 13 to engage with an inside of the lower die plate 6. When the lower die plate 6 is detached from the base body 1, a screwdriver or a rod-like special tool is inserted into a circular through-hole 14 formed on a front surface of the base body 1 to push the latch 12 and disengage the latch 12 from the lower die plate 6.

Left and right side pieces 10a of the handle 10 formed in a backward U-shape in the plan view are respectively fixed to both sides of the lid member 5. The handle 10 has a gripper 10b gripped when the lid member 5 is opened or closed. The rear end portions of the left and right side pieces 10a of the handle 10 are respectively supported by the hinge shaft 4 in a relatively pivotable manner. The abutting portion 10c having the claw shape is formed on each of the rear end portions of the left and right side pieces 10a of the handle 10. When the lid member 5 is opened, the abutting portions 10c are respectively made to abut with the second stoppers 8c provided on the operating levers 8 to limit the pivoting degree of the lid member 5 and stop the lid member 5 in the fully open position (the position shown by the two-dot chain line in FIG. 2). Thus, the lid member 5 is pivotably supported to the base body 1 by the support bracket 2 such that it is capable of pivoting together with the handle 10 around the hinge shaft 4 from the closed position where it is oriented in a substantially horizontal direction (for example, the position shown by the solid line in FIG. 2) to the fully open position where it is made to upward pivot at an angle of slightly exceeding 90 degrees (for example, the position shown by the two-dot chain line in FIG. 2), and vice versa.

In the present embodiment, since the second stopper 8c to stop the lid member 5 in the fully open position is provided on the operating lever 8 vertically moving together with the hinge shaft 4 according to the position adjustment of the hinge shaft 4, it is possible to constantly keep a fully open angle of the lid member 5 regardless of whether the hinge shaft 4 is held in the upper wide-width portion 3a or the lower wide-width portion 3a of the adjustment guide holes 3. Accordingly, it is possible to increase the handling of the electric cooker.

As shown in FIG. 5, an electric heater 15 to heat the upper die plate 7 from its backside is mounted on the lower surface of the lid member 5. The electric heater 15 is electrically coupled with the power supplying device mounted in the control box 9. Incidentally, either the upper electric heater 15 or the lower electric heater 11 may be omitted according to the kind of baking food.

The upper die plate 7 is formed in a square-like shape in the plan view, and is made of an aluminum alloy and so on in the same as the lower die plate 6. The upper die plate 7 is formed with a plurality of downward concavities 7a facing the concavities 6a of the lower die plate 6.

When the upper die plate 7 is mounted under the electric heater 15 on the lid member 5, it is engaged with a latch 16 provided on a front portion of the lower surface of the lid member 5 to be movable in the longitudinal direction (see FIG. 5) and is fixed in a mounted state. Incidentally, the latch 16 is biased frontward by a compression coil spring 17 to engage with an inside of the upper die plate 7. When the upper die plate 7 is detached from the lid member 5, a screwdriver or a rod-like special tool is inserted into a circular through-hole 18 formed on the front surface of the lid member 5 to push the latch 16 and disengage the latch 16 from the upper die plate 7.

Figure 2:
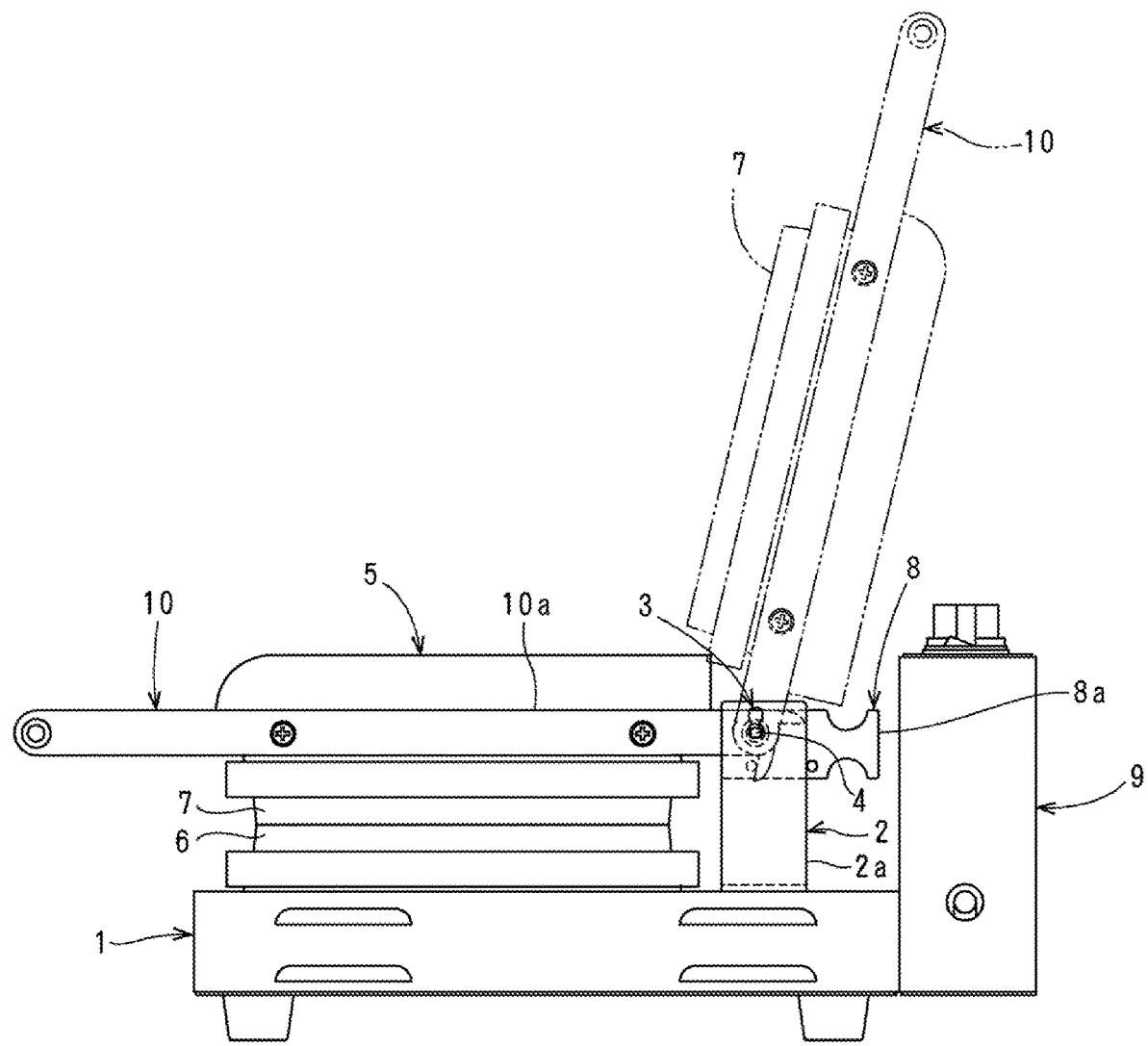
FIG. 2 is a right-side elevational view showing the electric cooker.
Figure 3:
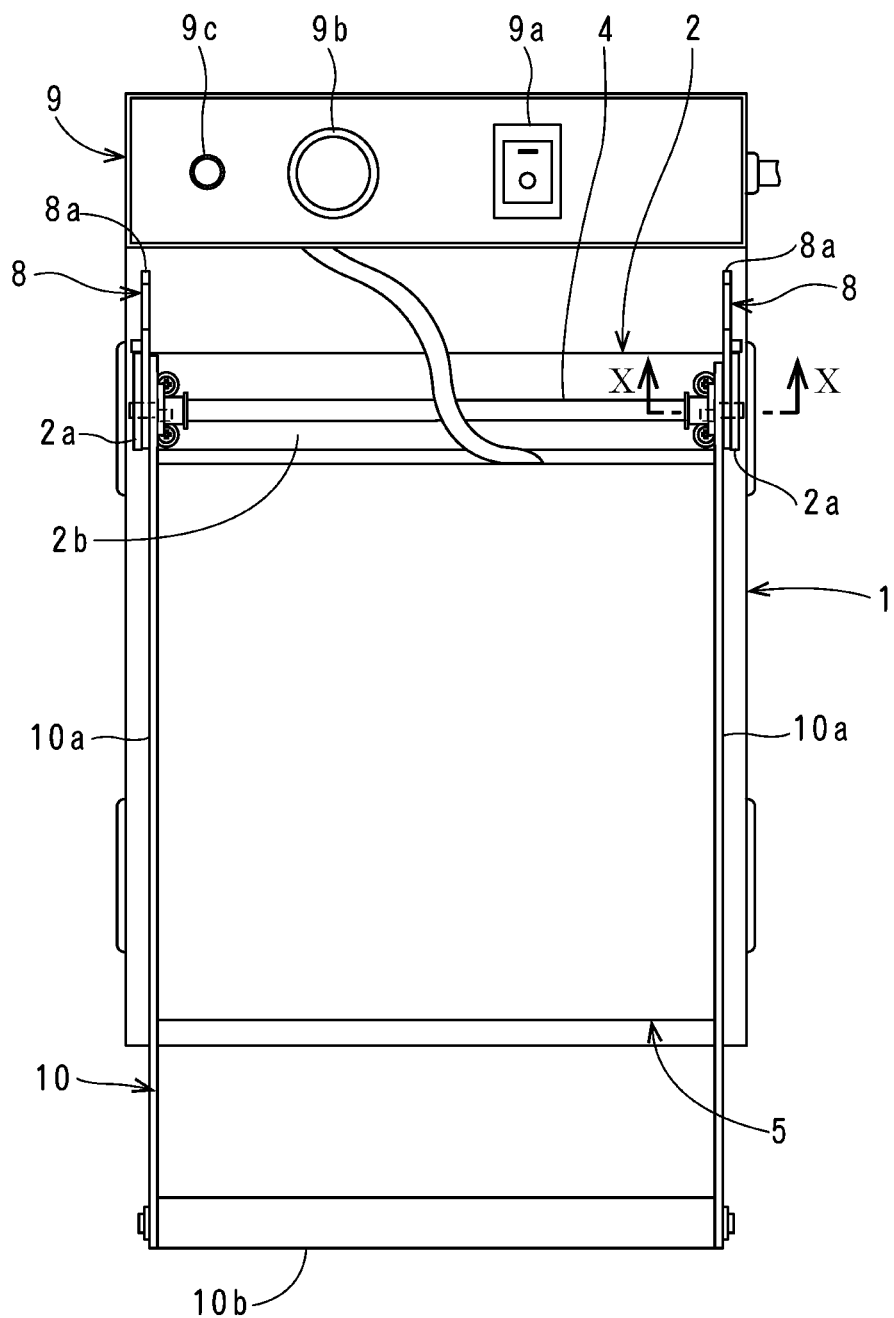
FIG. 3 is a top plan view showing the electric cooker.

To bake the baking food such as bread, snack cake, and so on by the electric cooker of the present embodiment, the lid member 5 is opened as shown in FIG. 2 (the two-dot chain line) and FIG. 4. At this time, in the case that the engaging shaft portions 4a of the hinge shaft 4 are respectively held in the lower wide-width portions 3a of the adjustment guide holes 3, when the lid member 5 is opened, the abutting portions 10c provided on the handle 10 are respectively made to abut with the second stoppers 8c in the fully open position of the lid member 5, as shown by the two-dot chain line in FIG. 7. Thus, the lid member 5 stops in the fully open position. Oil is applied to the concavities 6a of the lower die plate 6 as necessary while the lid member 5 is held in the fully open position, and then the dough kneaded previously is filled into the concavities 6a.

Next, as shown by the solid line in FIG. 2, the lid member 5 is made to pivot from the fully open position to the closed position around the hinge shaft 4 to closely fit the lower surface of the upper die plate 7 to the upper surface of the lower die plate 6, and then the lower and upper electric heaters 11, 15 are energized in a certain period to heat the lower and upper die plates 6, 7. Thus, the dough is heated to expand in each of the concavities 6a, 7a of the lower and upper die plates 6, 7 and the baking food is baked.

When the lower and upper die plates 6, 7 are respectively exchanged according to a kind of the baking food, the latch 12 on the side of the base body 1 and the latch 16 on the side of the lid member 5 are respectively released to detach the lower die plate 6 from the base body 1 and the upper die plate 7 from the lid member 5 respectively, and then the lower and upper die plates 6, 7 according to the baking food are respectively attached.

When the thickness of the lower and upper die plates 6, 7 after the exchange is larger than that of those before the exchange, the hinge shaft 4 is moved to the upper position.

To move the hinge shaft 4 to the upper position, as shown in FIG. 9, the operation part 8a is taken to make the operating lever 8 pivot upward (in the arrow direction) at an angle of about 90 degrees from the locked position shown by the two-dot chain line to the released position shown by the solid line. Thus, the hinge shaft 4 is rotated from the locked position to the released position, too. When the hinge shaft 4 is rotated to the released position, each of the long diameter directions x of the engaging shaft portions 4a of the hinge shaft 4 is oriented to the vertical direction and the engaging shaft portions 4a are made to be capable of passing through the narrow-width portions 3b of the adjustment guide holes 3 respectively. In this state, the engaging shaft portions 4a of the hinge shaft 4 are respectively moved from the lower wide-width portions 3a to the upper wide-width portions 3a. After the engaging shaft portions 4a are respectively moved to the upper wide-width portions 3a, the operating lever 8 is returned from the released position to the locked position. Thus, the hinge shaft 4 is rotated to the locked position such that each of the long diameter directions x of the engaging shaft portions 4a of the hinge shaft 4 is oriented to the longitudinal direction, and the engaging shaft portions 4a are made to be incapable of passing through the narrow-width portions 3b of the height-adjustment guide holes 3 respectively. Accordingly, the hinge shaft 4 is held in the upper wide-width portion 3.

In the case that the engaging shaft portions 4a of the hinge shaft 4 are respectively held in the upper wide-width portions 3a, when the operating lever 8 is operated to pivot such that the hinge shaft 4 is rotated together with the operating lever 8 from the locked position to the released position, it is possible to respectively move the engaging shaft portions 4a of the hinge shaft 4 from the upper wide-width portions 3a to the lower narrow-width portions 3b.

As described above, since the hinge shaft 4 and the rear end portion of the lid member 5 are possible to be adjusted stepwise in the vertical direction according to the thickness of the respective lower and upper die plates 6, 7 by a simple operation just by the pivot operation of the operating lever 8, even when the lower and upper die plates 6, 7 are respectively exchanged to those having different thickness, a proper usage state can be obtained by closely fitting facing surfaces of the respective lower and upper die plates 6, 7. Moreover, since the hinge-shaft-height adjustment mechanism has an extremely simple structure, it is possible to reduce costs and provide a low-cost electric cooker.

The present invention is not limited to the above embodiment and various changes and modifications may be added to the above embodiment without departing from the gist of the present invention as follows.

(1) More than three wide-width portions 3a are formed in the adjustment guide hole 3.
(2) Instead of the formation that the respective rear end portions of the handle 10 fixed to the lid member 5 are pivotably supported by the hinge shaft 4, a part of the lid member 5 except for the handle 10 is pivotably supported by the hinge shaft 4.
(3) The support portions 2a are formed as integral portions of the base body 1.

What is claimed is:
1. An electric cooker comprising:
a base body provided with an electric heater;
a lower die plate detachably mounted on an upper surface of the base body;
a lid member which is provided with an electric heater and is pivotably supported to the base body in a relatively pivotable manner by a hinge shaft oriented in a lateral direction such that the lid member is capable of upward pivoting;
an upper die plate detachably mounted on a lower surface of the lid member such that a lower surface of the upper die plate overlaps with an upper surface of the lower die plate; and
a hinge-shaft-height adjustment mechanism capable of adjusting a vertical position of the hinge shaft;
wherein the hinge-shaft-height adjustment mechanism includes a support portion mounted on the base body;
an adjustment guide hole formed on the support portion to have a wide-width portion and a narrow-width portion alternately in a vertical direction;
the hinge shaft formed with an engaging shaft portion on an end portion, the engaging shaft portion being engaged with the adjustment guide hole to be capable of moving vertically and rotating; and
an operating lever capable of pivoting integrally with the hinge shaft, and
wherein the engaging shaft portion is capable of moving from either the wide-width portion in an upper or lower side to the other of these wide-width portions through the narrow-width portion by rotating at a predetermined angle according to a pivoting operation of the operating lever.

2. The electric cooker according to claim 1, wherein a cross-section of the engaging shaft portion of the hinge shaft is formed in a shape having a long diameter larger than an open width of the narrow-width portion of the adjustment guide hole and a short diameter smaller than the open width of the narrow-width portion.

3. The electric cooker according to claim 2, wherein the operating lever is capable of pivoting from a locked position in where the engaging shaft portion of the hinge shaft is incapable of passing through the narrow-width portion to a released position in where the engaging shaft portion of the hinge shaft is capable of passing through the narrow-width portion and vice versa.

4. The electric cooker according to claim 3, wherein the operating lever has a first stopper abutting with the support portion to stop the operating lever in the locked position.

5. The electric cooker according to claim 4, wherein the operating lever has a first stopper abutting with the support portion to stop the operating lever in the locked position.

6. The electric cooker according to claim 4, wherein the operating lever has a second stopper with which a part of the lid member abuts in a pivoting direction to stop the lid member in a fully open position when the operating lever is in the locked position.

7. The electric cooker according to claim 3, wherein the operating lever has a second stopper with which a part of the lid member abuts in a pivoting direction to stop the lid member in a fully open position when the operating lever is in the locked position.

8. The electric cooker according to claim 7, wherein the operating lever has a second stopper with which a part of the lid member abuts in a pivoting direction to stop the lid member in a fully open position when the operating lever is in the locked position.

9. The electric cooker according to claim 1, wherein the operating lever is capable of pivoting from a locked position in where the engaging shaft portion of the hinge shaft is incapable of passing through the narrow-width portion to a released position in where the engaging shaft portion of the hinge shaft is capable of passing through the narrow-width portion and vice versa.

10. The electric cooker according to claim 9, wherein the operating lever has a second stopper with which a part of the lid member abuts in a pivoting direction to stop the lid member in a fully open position when the operating lever is in the locked position.

* * * * *